United States Patent [19]

Bell et al.

[11] Patent Number: 4,458,537

[45] Date of Patent: Jul. 10, 1984

[54] HIGH ACCURACY DIFFERENTIAL PRESSURE CAPACITIVE TRANSDUCER

[75] Inventors: Robert L. Bell, Chatsworth; Richard A. Lathlaen, Thousand Oaks, both of Calif.

[73] Assignee: Combustion Engineering, Inc., Windsor, Conn.

[21] Appl. No.: 262,545

[22] Filed: May 11, 1981

[51] Int. Cl.³ .............................................. G01L 9/12
[52] U.S. Cl. ..................................... 73/718; 361/283
[58] Field of Search ................. 73/718, 724; 361/283, 361/278; 264/259; 29/25.41

[56] References Cited

U.S. PATENT DOCUMENTS

| | | | |
|---|---|---|---|
| 2,509,310 | 2/1950 | Moreland, Jr. | 361/283 |
| 3,529,238 | 9/1970 | Fiet | 324/61 |
| 3,618,390 | 11/1971 | Frick | 73/718 |
| 3,657,630 | 4/1972 | Fiet | 318/676 |
| 3,993,939 | 11/1976 | Slavin et al. | 361/278 |
| 4,092,696 | 5/1978 | Boesen et al. | 73/753 |

*Primary Examiner*—Donald O. Woodiel
*Attorney, Agent, or Firm*—Troxell K. Snyder

[57] ABSTRACT

A capacitive pressure transducer is disclosed in which a sensing diaphragm bearing an electrode is mounted to flex in response to applied fluid pressure relative to a reference member having an opposed electrode. A thin film or layer of dielectric material such as glass covers the reference member electrode and has formed therein a concavity matching the flexed curvature of the sensing diaphragm at its limit position. The dielectric layer has a high compressive strength and substantially enhances linearity by providing a substantially higher capacitance than the equivalent fluid-filled space. The transducer is retained within a transducer assembly under compressive preload, the assembly further including thermal strain relief means. Also disclosed are methods of making the transducer, which methods include thick film screen deposition techniques for forming concavities having preselected contours in the dielectric layer.

34 Claims, 8 Drawing Figures

HIGH ACCURACY DIFFERENTIAL PRESSURE CAPACITIVE TRANSDUCER

BACKGROUND OF THE INVENTION

This invention relates to pressure transducers and more particularly to differential pressure capacitive transducers and methods for making same, which transducers are low cost yet capable of measuring very small pressure differentials with extreme accuracy and providing, in conjunction with associated electronic circuitry, an output signal that is highly linear.

Differential pressure capacitive transducers generally comprise a disk-shaped sensing diaphragm having a peripheral margin securely mounted between a pair of support members or reference plates. The surface of each reference plate facing the diaphragm has a depression defining a fluid cavity. The depressed surfaces of the reference plates have conductive coatings which, in conjunction with metal diaphragm surfaces, form the electrodes of a pair of variable capacitors. Differences between the pressure of the fluid on opposite sides of the diaphragm cause the diaphragm to deflect, the magnitude of the deflection being a function of the differential pressure across the diaphragm. The deflection in turn is manifested by changes in the capacitances of the two variable capacitors; those capacitances are measured differentially by appropriate electronic circuitry providing a transducer output signal.

Differential pressure capacitive transducers of the above-described kind are known in which the depressions defining the fluid cavities have concave contours. Examples of such transducers are disclosed by the following U.S. Pat. Nos.

2,667,786 (Spaulding)
2,999,385 (Wolfe)
2,999,386 (Wolfe)
3,232,114 (Ferran)
3,557,621 (Ferran)
3,618,390 (Frick)
3,880,413 (Frick)
2,509,310 (Moreland, Jr.)
3,529,238 (Fiet)
3,657,630 (Fiet)

As taught by Spaulding in U.S. Pat. No. 2,667,786, one advantage of using a concave fixed surface (as opposed, for example, to a flat-bottomed surface) is that greater sensitivity is provided because the average spacing between the diaphragm and the reference surfaces is considerably less. Another advantage of a concave contour, as disclosed in U.S. Pat. No. 2,999,385 (Wolfe), is that it can be shaped to conform to the curvature of the deflected diaphragm and thereby serve as a support surface against which the diaphragm can uniformly bottom out under overpressure conditions.

As taught by the Moreland, Jr., and the Fiet patents, such surface should be insulating in order to prevent short circuits upon bottoming out. As taught by Tamai, in a liquid-filled transducer, such surface should be crystallized glass in order to prevent dielectric breakdown at small spacings.

Despite the advantages of such contoured surfaces, prior art devices evidence several drawbacks. The principal disadvantage is that the cavities must be formed by grinding the reference plates—typically made of an insulating material such as glass or ceramic—to the desired contour. Since the natural deflection curve of the sensing diaphragm is a complex function, the production of the desired shape with the required degree of precision introduces a costly machining operation. Thus, in the manufacture of prior art transducers a compromise is struck: machining costs are reduced somewhat by settling for simpler contours. Thus, patent 3,618,390 discloses grinding a spherical surface into the glass while in patent 3,557,621 a "conic" surface is recommended. However, while simpler, those contours at best only approximate the natural deflection curve of the diaphragm. The results are that the diaphragm does not bear uniformly against the cavity surface during overpressure conditions, thereby increasing the possibility of fatigue and failure of the diaphragm, and that the linearity of the transducer output is reduced.

Thus, one object of the present invention is to provide a method of making a differential pressure capacitive transducer in which the fluid cavities adjacent the diaphragm can be precisely contoured to the natural deflection curve of the diaphragm in an exceedingly simple and inexpensive manner.

The prior art, as exemplified by the above-identified Frick patents, also discloses the use of additional diaphragms that isolate the sensing diaphragm from the fluids whose differential pressure is to be measured. Those fluids are coupled to the sensing diaphragm through liquid, typically in the form of an inert oil, that completely fills the spaces bonded by the isolation diaphragm on either side of the sensing diaphragm. The isolation diaphragms are corrugated so as to facilitate flexing and, as shown by the Frick patents, the outer surfaces of the reference plates are correspondingly shaped to conform to the corrugations to permit the isolation diaphragms to be disposed very close to the outer surfaces to reduce the volume of oil and thereby minimize the effects of temperature variations. To achieve the desired close proximity of the isolation diaphragms and the reference plates while avoiding contact between them, highly precise machining techniques are used to conform the shape of the outer surfaces of the reference plates to that of the corrugated diaphragm, again adding considerable manufacturing costs.

It is therefore another object of the present invention to provide a simple, low cost method of making the reference plates and the isolation diaphragms while assuring that the surface shapes of the plate and diaphragm match precisely.

SUMMARY OF THE INVENTION

Capacitive pressure transducers in accordance with the present invention are characterized by a combination including a film or layer of material having advantageous electrical and load bearing properties over the electrode on the reference plate relative to which the sensing diaphragm is movable. The layer is typically a high compressive strength material having dielectric properties, providing a flexure limiting barrier for the diaphragm and substantially enhancing linearity by providing a substantially higher capacitance than the equivalent fluid filled space. This combination is particularly suitable for small differential transducers having thin ceramic sensing diaphragms and small inter-electrode spacings, for use in high pressure applications.

In accordance with one aspect of the present invention, there is provided a capacitive pressure transducer including a reference plate of electrically insulating material having a planar surface, a fixed electrode deposited on the planar surface and a relatively thin layer of electrically insulating material, such as glass, covering the planar surface and the electrode thereon. The transducer further includes a sensing diaphragm having an active, electrode-supporting portion in confronting relationship with the glass layer and spaced therefrom, the reference plate electrode and the sensing diaphragm electrode being so disposed as to form the conductive elements of a variable capacitor. This construction, characterized by the intervening glass layer, has the advantage of preventing electrical contact between the fixed and movable electrodes during overpressure conditions.

In accordance with other specific aspects of the invention, the glass layer has a central depression or concavity and the active, electrode-supporting portion of the sensing diaphragm spans the concavity. The contour of the concavity matches the natural deflection curve of the active portion of the diaphragm so that the diaphragm bottoms out uniformly along the entire cavity surface thereby minizing the possibility of fatigue and failure of the diaphragm. Still further, the thin glass layer has a dielectric constant that is substantially greater than unity so that the capacitance of the instrument is determined principally by the gap between the electrode-supporting surface of the sensing diaphragm and the surface of the concavity. The result is that the linearity of the transducer can be substantially enhanced.

Suitable high compressive strength dielectrics, such as glass, can be chosen which have a substantially higher dielectric constant than oil or another pressure cavity fluid in the system. Where the interelectrode spacings are to be very small (e.g. less than about 0.5 mm.) the capacitance of the unit with an undeformed diaphragm can still be substantially larger than heretofore, such as greater than 30 picofarads. The shaped dielectric and fluid filled space provides a composite capacitance that varies linearly until the flexing diaphragm abuts against the dielectric.

Another aspect of the invention relates to simple, inexpensive, thick film screen printing methods for depositing the glass layer and forming the contoured surface therein. Pursuant to one, specific example of this part of the invention, a series of concentric rings are formed on one surface of a screen, each ring having a uniform height above the surface of the screen. The heights of the different rings vary, however, in accordance with the desired contour of the cavity. The rings may be formed from a succession of light-sensitive emulsion layers applied to the screen. The layer, which have predetermined thicknesses determined by the final contour, are selectively cured by light transmitted through film positives carrying the images of the rings. The assembly comprising the screen and rings is then placed with the ring-side down over the planar surface of the reference plate. Next, a liquid glass composition is forced through the screen which, because of its compliance, allows the edges of all the rings to engage the planar surface. Removal of the screen assembly leaves the glass layer with the contoured depression formed therein.

Still another aspect of the invention relates to a simple, low cost method for forming annular corrugations in the isolation diaphragms. A reference plate blank is first formed by pressing a ceramic material, such as alumina, into a mold. The blank includes an outer surface in which a series of concentric, circular grooves of generally sinusoidal cross-section, are formed by means of a punch pressed into the surface. After the reference plate is fired, a metalization ring is deposited about the periphery of the outer surface and a flat, disk-shaped metal sheet, of stainless steel or the like, is bonded to the metalization ring. Hydraulic pressure of sufficient magnitude is then applied to the outer surface of the sheet metal disk forcing the sheet into the circular grooves to form the corrugations.

BRIEF DESCRIPTION OF THE DRAWINGS

A better understanding of the invention may be had by reference to the following description, taken in conjunction with the accompanying drawings, in which.

DESCRIPTION OF THE PREFERRED EMBODIMENT

Figure 1:
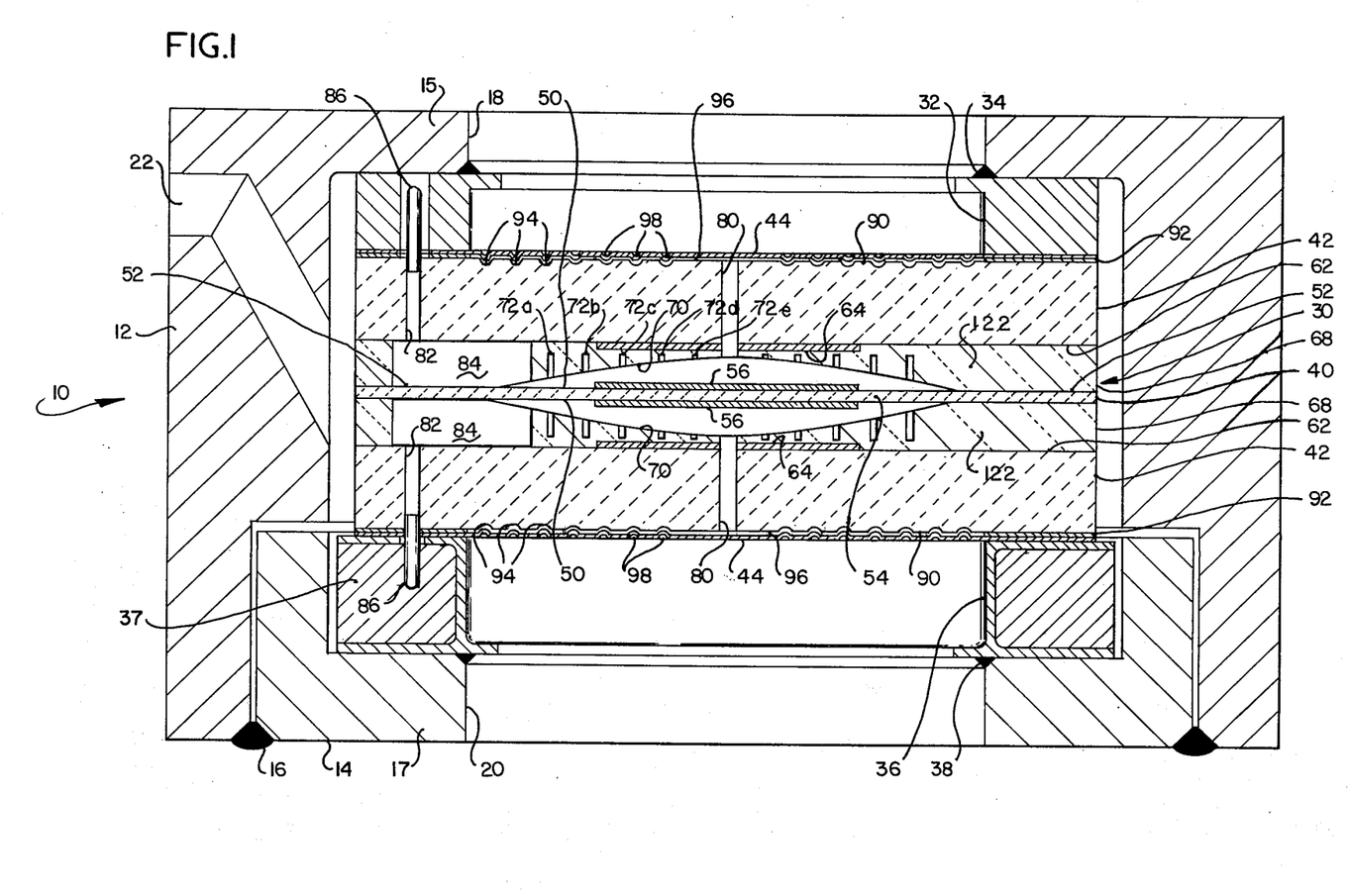
FIG. 1 is a side elevation view, in section, of a differential pressure capacitance transducer assembly according to one specific embodiment of the invention.
Figure 2:
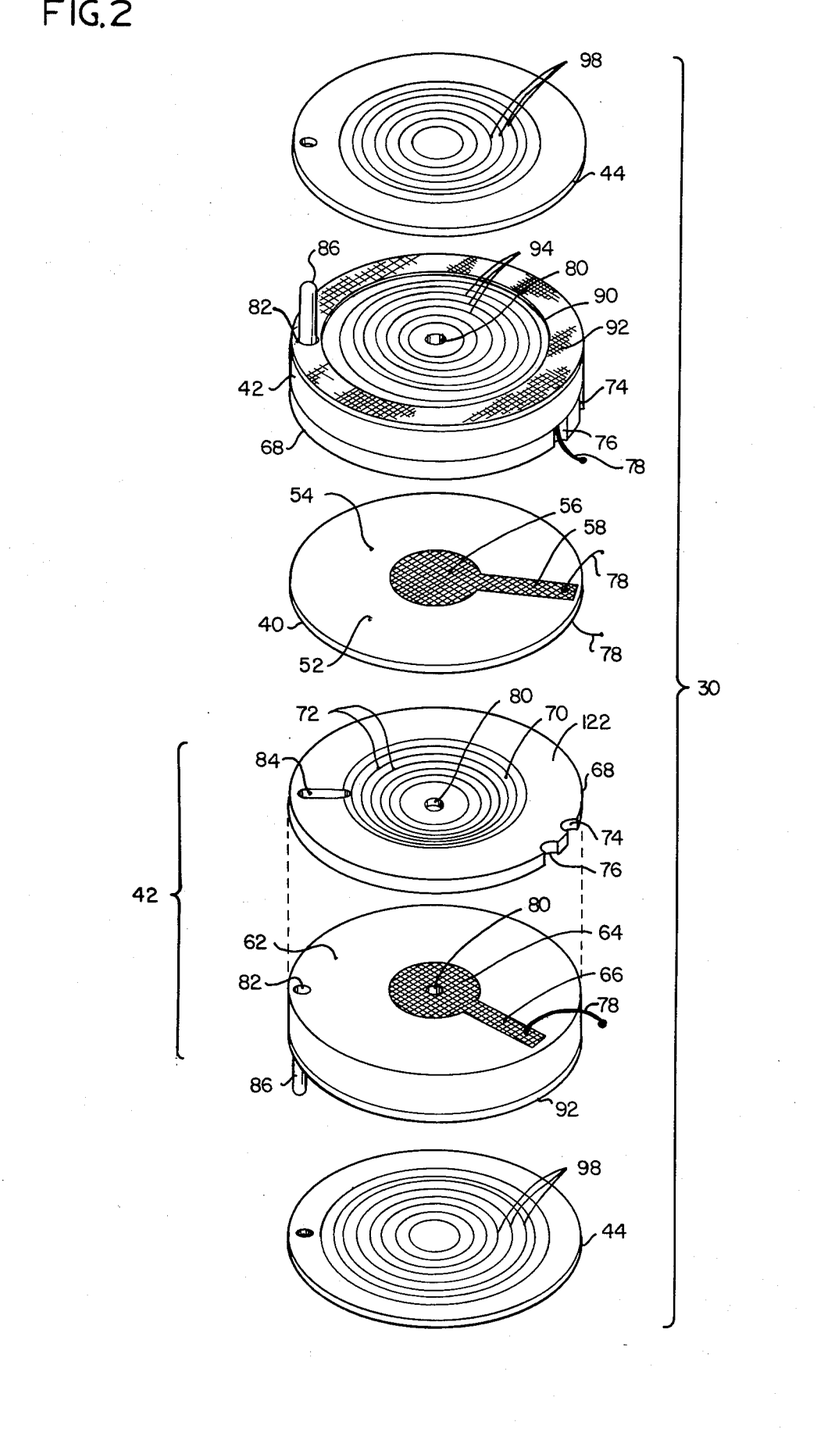
FIG. 2 is an exploded, perspective view of the transducer forming part of the assembly of FIG. 1.
Figure 3:
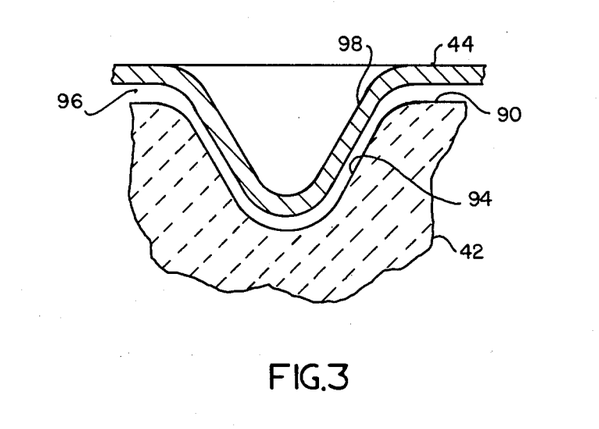
FIG. 3 is a portion of the side elevation view of FIG. 1 showing details of the isolation diaphragm and reference plate, which portion has been greatly enlarged to show specific details of the structure.

Turning now to the drawings, and in particular FIGS. 1-3, there is shown a differential pressure capacitive transducer assembly and details thereof in accordance with an exemplary form of the invention that is particularly suitable for industrial applications. It should be noted that these drawings are not to scale; the sizes of certain parts of the transducer have been greatly exaggerated for clarity.

The illustrated embodiment comprises a housing 10 including outer and inner ring-shaped sections 12 and 14 secured together by a circular weld 16. Housing sections 12 and 14 have inwardly-projecting flanges 15 and 17, respectively, defining central openings 18 and 20 for admitting the fluids whose differential pressure is to be measured. Housing section 12 also has a passage 22 to accommodate electrical leads.

The housing 10 encloses a generally cylindrical differential pressure capacitive transducer 30 securely clamped between a ring 32 attached to the flange 15 by a weld 34 and an annular spacer 36 having a channel-shaped section filled with a thermal strain relief material 37. The spacer 36 is supported by the flange 17 and is affixed thereto by a weld 38.

The transducer 30 comprises a disk-shaped sensing diaphragm 40 sandwiched between a pair of opposed cylindrical reference plates 42, and a pair of disk-shaped isolation diaphragms 44. The sensing diaphragm 40, molded of a pressed ceramic material such as alumina, has opposed, relatively flat surfaces 50, an annular peripheral region 52 held fixed between the plates 42 and a central, active portion 54 deflectable in response to applied pressure. Thin, electrically conductive coatings 56 are deposited on the active portion 54. These coatings form the movable electrodes of a pair of variable capacitors used to measure the differential pressure across the transducer. Each electrode 56 is circular and has a projection 58 serving as an electrical lead extending radially to a point proximate the periphery of the sensing diaphragm. The electrodes 56 may be applied by way of any of a number of well known deposition techniques.

The opposed reference plates 42 are identical and are made principally of a moldable material, such as alumina, that has been press-molded to shape and fired. Each reference plate has an inner, planar surface 62 that has deposited thereon a thin, circular conductive coating 64. The coatings 64 form the fixed electrodes of the pair of variable capacitors. Each fixed electrode 64 has a conductive lead 66 extending radially to a point adjacent the periphery of the reference plate. Covering the planar surface 62 and electrode 64 of each reference plate is a thin glass layer 68 having a depression or concavity 70 that has a precise, predetermined shape, for example, one that conforms to the natural deflection curve of the sensing diaphragm 40. The active portion 54 of the diaphragm spans the depression 70. The glass layer 68 has a series of annular slots 72a–72e which result from the method (which will be described below) used to deposit the layer 68. The glass layer 68 also has a pair of edge notches 74, 76 in alignment with the outer extremities of the leads 58 and 66 of the fixed and movable electrodes carried by the reference plates and diaphragm. Notches 74 and 76 serve as vias for electrical conductors 78 connected to the electrode leads. Each reference plate 42 also includes a central, axially-oriented passage 80 extending through the entire thickness of the reference plate, including the glass layer, as well as an axially-oriented passage 82 disposed along the periphery of the plate and extending through the ceramic portion of the reference plate. A radial slot 84 formed in the glass layer 68 provides communication between the passage 82 and the cavity 70. A small, stainless steel tube 86 inserted in the passage 82 projects from the reference plate.

Each reference plate 42 further has an outer surface 90 having a thin, metal coating or metalization ring 92 deposited along the periphery of the plate. The ring 92 is typically about 0.0005–0.005 inch (0.0127–0.127 mm) thick. Disposed within the confines of the metalization ring 92 are a series of concentric grooves 94 having a generally sinusoidal cross-section, as best shown in the detail of FIG. 3.

The isolation diaphragms 44, fabricated of thin sheets of stainless steel, are bonded to the metalization rings 92. Because the rings 92 are very thin, the isolation diaphragms 44 are very close to the reference plate outer surfaces. In their unflexed state, the isolation diaphragms 44, in conjunction with the surfaces 90, define generally disk-shaped chambers 96. Each isolation diaphragm has a set of annular corrugations 98 which in cross-sectional shape precisely match the circular grooves 95, again as best shown in FIG. 3. The precise matching of the corrugations and grooves is accomplished in the following efficient, low cost manner: during the press-molding of the alumina reference plate, the outer surface of the plate is indented with a punch having concentric projections to form the generally sinusoidally-shaped grooves 94. After firing of the reference plates and assembly of the transducer, a thin, flat, disk-shaped sheet of stainless steel is bonded to the metalization ring 92. The entire assembly is then subjected to hydraulic pressure of the order of 6,000 psi ($4.14 \times 10^7$ Pa) causing the sheet metal to be pressed against the outer surface of the reference plates and forcing the sheet metal into the grooves thereby making it conform to the contours thereof. In other words, the reference plates themselves serve as the dies for forming the isolation diaphragm corrugations thus insuring precise correspondence with the reference plate grooves.

The unit depicted in FIGS. 1 and 2 is a small industrial differential transducer that may be regarded, from the structural standpoint, as having a thick flexing diaphragm. The diaphragm is of ceramic in this example and flexes only over a small distance, because the spacing between opposed electrodes is less than about 0.5 mm. With the cavity filled with a typical oil, which has a dielectric constant of approximately 2.3, this spacing would give a capacitance (unflexed) of about 18 picofarads. With a contoured dielectric of glass, having a dielectric constant of about 10, the capacitance (unflexed) increases to in excess of 20 picofarads. This enables the spacing size to be reduced if desired, and in any event improves performance. A dielectric constant that is substantially higher (e.g., 1000) would further improve the composite capacitance of the device, but the ability to withstand compressive forces when high pressure fully flexes the diaphragm is usually of significance. In any event, the composite capacitance of the volume between the facing electrodes varies in accordance with diaphragm flexure to a limit defined by physical contact of the diaphragm with the dielectric.

Another factor that should be considered in selecting the high compressive strength dielectric is that it may conveniently be deposited at the same time as a peripheral seal. Thus glass, many types of which can provide a seal and bond for ceramics, is advantageous for this reason as well. Passivation glasses of the type offered by a number of manufacturers (see, e.g., "'81 Solid State Processing & Production Buyers Guid & Directory", published by Symeon, Port Washington, N.Y. 11050, p. 144, under "Glass, Electronic") are typically suitable in dielectric constant, compressive strength and sealing properties.

Figure 4:
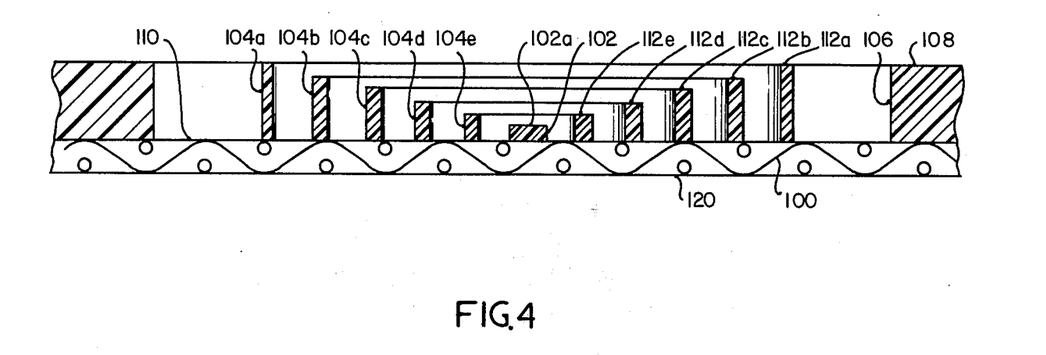
FIG. 4 is a side elevation view, in section, of a multilayer screen assembly for depositing a precisely contoured glass layer on the reference plates.
Figure 5:
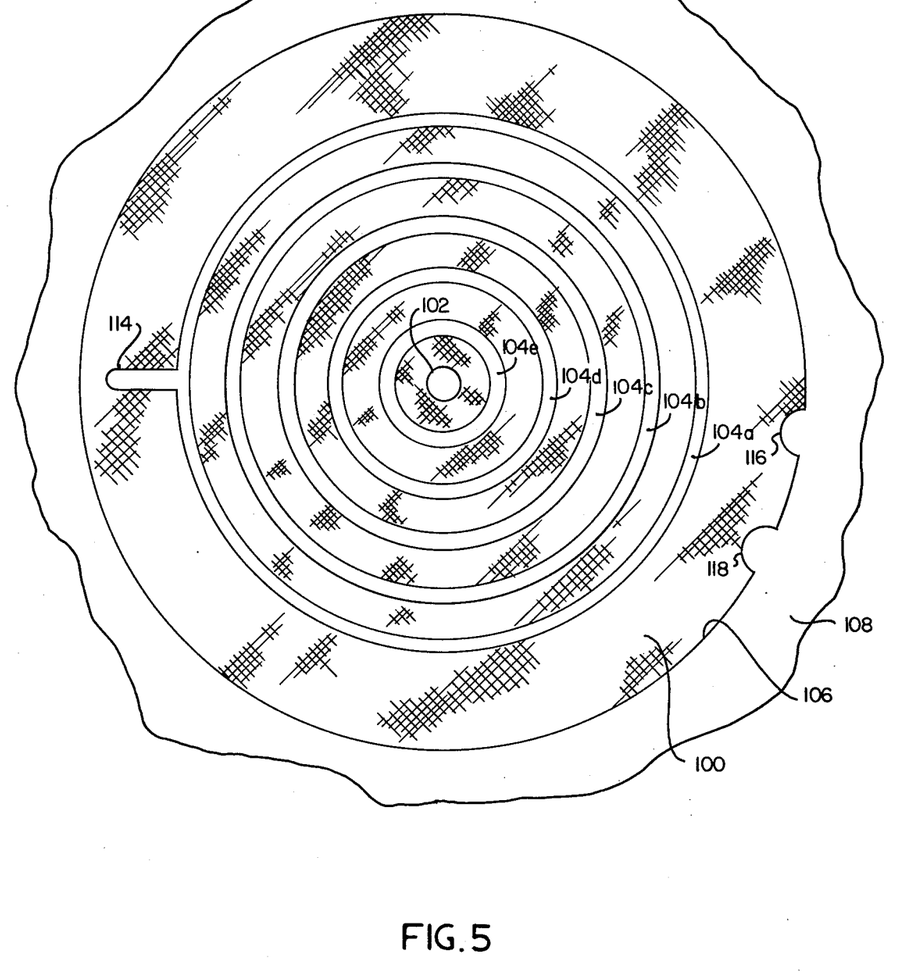
FIG. 5 is a plan view of the screen assembly shown in FIG. 4.

In accordance with another aspect of the invention, the glass layer 68 is deposited on the planar surface 62 of the reference plate 42 by a thick film screen printing method that is capable of providing complex, three dimensional surfaces. While yielding precise contours, the method is simple and inexpensive in comparison to the numerically controlled machine operations presently used. FIGS. 4 and 5 show the manner in which a screen assembly is prepared for depositing the glass layer. The screen assembly includes a screen 100 which may be made of stainless steel or the like having a suitable mesh fineness for obtaining the desired resolution and definition. In the example shown, a central cylindrical projection 102 and a series of five concentric rings 104a–104e of varying heights disposed within the confines of a circular opening 106 in a mask 108 are fixed to one surface 110 of the screen. The end 102a of the projection 102 and the edges 112a–112e of the rings define the desired contour. The outer ring 104a has a projection 114 that defines the slot 84 in the glass layer while the outer mask 108 has a pair of inwardly directed projections 116 and 118 for defining the via notches 74 and 76.

Each ring 104a-104e is formed independently from an ultraviolet light-sensitive emulsion layer having a predetermined thickness. That thickness is dependent upon the final height of the ring and the depth or extent to which the emulsion layer is embedded in the screen. In each instance, a film positive bearing the image of the particular ring being formed is placed over the emulsion layer in appropriate registration therewith. Ultraviolet light transmitted through the positive hardens or cures the emulsion in the ring pattern carried by the positive. The unexposed emulsion that has not been cured by the action of the light is then wased away leaving the ring. Starting with the outer ring 104a, the process is repeated for each ring.

The screen assembly is placed over the planar surface 62 of the reference plate (which has already been coated with the electrode 64) with the emulsion side of the screen facing the reference plate. A liquid glass composition, typically consisting of particulate glass, a binder and a screening vehicle, is forced through the screen from the other surface 120 by means of a squeegee in a manner well known in the screen printing art. Because of the compliance of the screen assembly, the extremities 102a and 112a-112e of the projection 102 and rings 104a-104e are pressed into engagement with the reference plate surface. Removal of the screen assembly leaves the glass layer with the contoured depression formed therein. The annular slots 70a-70e formed by the rings remain in the final glass structure. The glass layer is then dried after which the reference plate assembly is fired.

The heights of the elements 102 and 104a-104e are defined by the disk deflection equation $$y/y_{max} = a(b^2 - r^2)^2$$

where
r is the radial distance from the central axis to the point under consideration;
y is the deflection at the point under consideration;
$y_{max}$ is the maximum deflection of the diaphragm at its center; and
a and b are constants.

The area between the outer ring 104a and the mask 108 defines an outer annular margin or spacer portion 122 of the glass layer. The thickness of the margin 122 is determinative of the distance separating the movable electrodes 56 and the fixed electrodes 64 under no-load conditions. However, when the dielectric constant of the glass is substantially greater than unity (for example, in accordance with a practical example of the invention that constant is 10), the effective capacitive gap is determined by the open area between the diaphragm and the concave surface of the glass layer. That gap, which of course varies as a function of radius, can be made very small at its maximum point, for example, 0.00005 inch (0.00127 mm), although more typically it will be of the order of 0.0005 inch to 0.01 inch (0.0127 to 0.254 mm).

It will be obvious to those skilled in the art that more or less than five rings may be used and that the rings need not be concentric or even circular. Thus, the rings or their non-circular variations, in a manner analogous to the contour lines on a topographic map, can be used to define (within the limits imposed by the screening process) virtually any surface shape.

Figure 6:
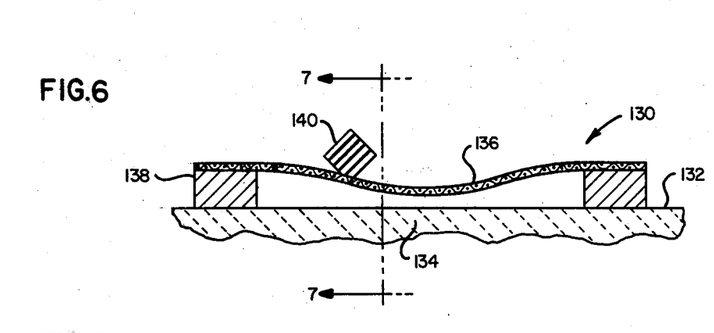
FIG. 6 is a somewhat schematic, side elevation view, in section, of an alternate screen-printing assembly for depositing the contoured glass layer on the reference plates.
Figure 7:
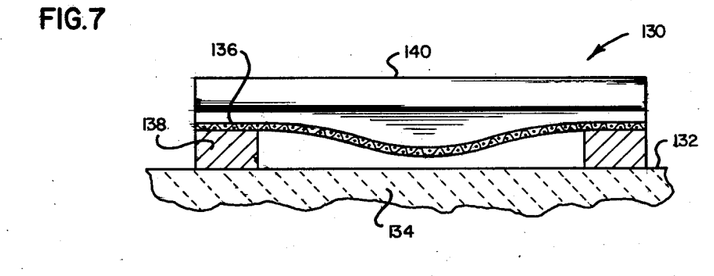
FIG. 7 is a front elevation view, in section, of the assembly of FIG. 6 as seen along the plane 7—7.

FIGS. 6 and 7 illustrate in somewhat schematic form a thick film screen-printing assembly 130 that may be used to apply the contoured glass layer according to an alternate technique within the scope of this aspect of the invention. The assembly 130, shown resting on the planar surface 132 of a reference plate 134, comprises a screen 136 stretched over frame 138 and retained thereby under a suitable level of tension. A liquid glass composition is applied to the screen and forced therethrough by a rubber squeegee 140 pressed down on the screen assembly. It has been found that the combination of the elastic properties of the squeegee and the screen causes a screen deflection that conforms closely to the equation set forth above. Such variables as the durometer hardness of the squeegee, the force applied to the sequeegee and the screen tension may be preselected to control the maximum displacement and the precise curvature of the deflected screen.

Upon firing of the final transducer assembly, the annular margins 122 of the glass layers not only form bonds that join the alumina reference plates and diaphragm, but define the active portion of the diaphragm and hermetically seal the periphery. Since glass is weak in tension but very strong under compression, the aforementioned functions are made possible by applying a high level compressive preload to the housing sections 12 and 14 and then securing those sections with the circular weld 16 while the preload is maintained. After the transducer assembly is completed, the transducer is filled with an incompressible liquid, such as an inert oil, through the stainless steel tubes 86 which are thereafter sealed.

The function of the thermal relief spacer 36 is to maintain the compressive preload applied to the transducer at a substantially constant level despite temperature variations. To that end, the material 37 enclosed within the spacer 36 is selected to have thermal expansion/contraction properties that compensate for those of the housing 10 and transducer 30. An example of such material is copper which, when used in conjunction with a mild steel housing and a transducer that is essentially 94% alumina, has been found capable of maintaining a substantially constant transducer stress level.

Figure 8:
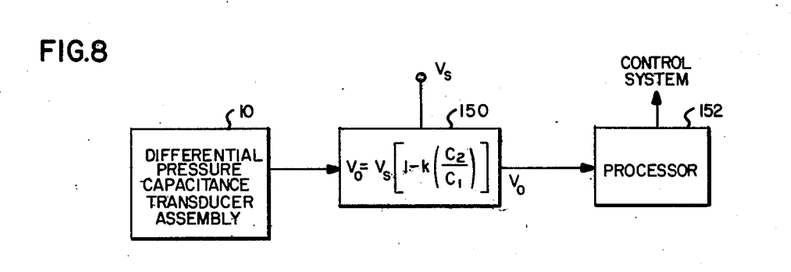
FIG. 8 is a block diagram of a differential pressure capacitance transducer system incorporating features of the invention.

FIG. 8 shows in block diagram form the principal components of a system utilizing the transducer assembly 10 of the present invention. The transducer output is coupled to associated hybrid circuitry 150 which in turn has a precise linear output $V_o$ applied to a processor 152. The function of capacitance vs. differential pressure in the present design lends itself to the use of a circuit that has the relatively simply transfer function $$V_o = V_s[1 - k(C_2/C_1)]$$

where
$V_o$ is the output voltage of the circuit 150;
$V_s$ is the supply voltage;
$C_1$ and $C_2$ are the transducer capacitances; and
k is a constant that includes factors such as trim resistances.

When the transducer is subjected to overpressure conditions up to 2500 psi ($1.72 \times 10^7$ Pa.) on either side of the unit's input pressure ports, the glass contour supports the sensing diaphragm to prevent damage. Contact between the diaphragm and reference plate electrodes is prevented by the intervening glass layer thereby eliminating erratic output signals. When the glass contour corresponds to the natural deflection curvature of the diaphragm, the diaphragm seats along virtually its entire area so that the possibility of failure or fatigue is minimized. Moreover, the diaphragm and reference plate surfaces are smooth enough so that the diaphragm seals the central passage 80 during overpressure conditions. To the extent that the diaphragm may not precisely conform at all points to the shape of the cavity, an incompressible fluid backup between the diaphragm and glass contour is created so that protection of the diaphragm is assured. Under certain conditions, the isolation diaphragms may also bottom out. Here again, because of the precise conformity of the isolation diaphragm and the outer reference plate surface against which it bears, a high degree of protection is afforded. One or both of these protective mechanisms assure the survival of the device when subjected to 2500 psi ($1.72 \times 10^7$ Pa.) overpressure conditions even though the full scale measurement range of the unit may be as low as 0.05 psi (345 Pa.).

While a specific embodiment with certain modifications and variations have been described above, it will be appreciated that the invention is not limited thereto but encompasses all forms and variations falling within the scope of the appended claims. For example, it will be obvious that various aspects of the invention are equally applicable to single reference plate transducers.

What is claimed is:

1. A capacitive pressure transducer of the type including a diaphragm bearing an electrode and flexing convexly relative to a reference member having an opposed electrode and comprising:
   thin film dielectric means interposed between the diaphragm and the reference member and including a graduated height layer of non-conductive material of high compressive strength defining a flexure limiting concave barrier for the diaphragm.

2. The invention as set forth in claim 1 above, wherein the dielectric means comprises a plurality of glass rings whose surface are along the nominal limit deflection curvature of the diaphragm, the glass rings defining a dielectric between the opposed electrodes.

3. The invention as set forth in claim 1 above, wherein the transducer includes a pair of spaced apart reference members on opposite sides of the diaphragm and coupled thereto, the reference members each including electrodes and interposed dielectric means and means defining fluid passageways communicating between the different diaphragm-reference member spacings and the respective opposite sides of the transducer for providing pressurizing fluids thereto.

4. In a capacitive pressure transducer having a deformable diaphragm adjacent a reference surface, each having electrode means thereon disposed in opposing relation, there being non-conductive surface means disposed on at least the surface of the electrode means and defining a limit stop for the diaphragm, the improvement wherein the diaphragm comprises a ceramic element and the electrode means are disposed less than about 0.5 mm apart, and the non-conductive surface means defines a concavity substantially matching the flexed curvature of the diaphragm at its limit position.

5. A capacitive transducer of the type in which opposing electrodes are spaced apart on a reference surface and a deflectable member respectively within a variable pressure, displaceable fluid containing cavity, comprising:
   a dielectric member having a dielectric constant greater than that of the fluid medium, the dielectric member filling a part of the cavity over the electrode on the reference member and providing, with the displaceable medium, a composite capacitance that varies in accordance with the deformation of the diaphragm to a limit defined by physical contact of the diaphragm with the dielectric; the spacing between electrodes being less than about 0.5 mm and the capacitance of the transducer between the electrodes with an undeformed diaphragm being in excess of about 20 picofarads.

6. A capacitive pressure transducer comprising:
   a reference plate of electrically insulating material, said plate including an outer surface, an inner planar surface, a fixed electrode deposited on said planar surface and a thin layer of electrically insulating material covering said planar surface and said fixed electrode;
   a sensing diaphragm mounted adjacent said reference plate, said diaphragm including an active portion confronting said thin layer and spaced therefrom and a movable electrode deposited on said active portion, the fixed and movable electrodes forming the conductive elements of a variable capacitor whose capacitance varies in accordance with the deflection of the active portion of said sensing diaphragm;
   the thin layer of electrically insulating material having a concavity formed therein, the active portion of said sensing diaphragm facing said concavity, and there being means for making electrical connection to the fixed and movable electrodes.

7. A transducer, as defined in claim 6, in which:
   said concavity has a contour matching the natural deflection curve of the active portion of said diaphragm.

8. A transducer, as defined in either claim 6 or 7, in which:
   the thin insulating layer has a dielectric constant substantially greater than unity whereby the capacitive gas between the fixed and movable electrodes is determined substantially by the distance between the movable electrode and the surface of the concavity formed in the thin layer.

9. A capacitive pressure transducer comprising:
   a reference plate of electrically insulating material, the plate including:
   a planar surface having a first electrode thereon; and
   a thin layer of electrically insulating material covering the planar surface and the electrode thereon, the insulating layer including a concave portion and a spacer portion; and
   a sensing diaphragm having a fixed portion bonded to the spacer portion of the insulating layer and an active portion deflectable in response to applied fluid pressure, the active portion of the sensing diaphragm facing the concave portion of the insulating layer and carrying a second electrode, the first and second electrodes comprising the elements of a variable capacitor, the insulating layer preventing electrical contact between the first and second electrodes.

10. A capacitive pressure transducer, as defined in claim 9, in which:
    the concave portion of the insulating layer has a contour matching the natural deflection curve of the active portion of the diaphragm.

11. A capacitive pressure transducer, as defined in either claim 9 or 10, in which:
the insulating layer has a dielectric constant substantially greater than unity whereby the capacitive gap between the first and second electrodes is determined substantially by the distance between the second electrode and the surface of the concave portion of the insulating layer.

12. A differential pressure capacitive transducer comprising:
a pair of opposed reference plates of electrically insulating material, each plate including an outer surface, an inner planar surface, a fixed electrode deposited on said planar surface and a thin, glass layer covering said planar surface and said fixed electrode, the glass layer including a central portion having a concavity formed therein, the concavities in the glass layers being in facing relationship;
a sensing diaphragm of electrically insulating material interposed between the glass layers, the sensing diaphragm having an active portion spanning the facing concavities and being deflectable in response to differences between applied fluid pressures, the active portion further having opposed surfaces with movable electrodes deposited thereon, the fixed and movable electrodes defining a pair of variable capacitors whose capacitances depend on the amount of deflection of the active portion of the sensing diaphragm, the concavities in the glass layers having a contour matching the natural deflection curve of the active portion of the sensing diaphragm and the glass layers having a relatively high dielectric constant whereby the capacitive gaps of the variable capacitors are defined substantially by the concavities in the glass layers; and
means for making electrical connection to said fixed and movable electrodes.

13. A differential pressure capacitive transducer assembly comprising:
a housing having a pair of openings for admitting the fluids whose differential pressure is to be measured;
a differential pressure transducer mounted within said housing, said transducer comprising:
a pair of opposed reference plates of electrically insulating material, each plate including an outer surface, an inner planar surface, a fixed electrode deposited on said planar surface and a thin layer of electrically insulating material covering said planar surface and said fixed electrode, the thin insulating layer having a central portion with a concavity formed therein, the concavities in the insulating layers on the two plates being in facing relationship; and
a sensing diaphragm interposed between the insulating layers of the reference plates, the sensing diaphragm having an active portion spanning the facing concavities and being deflectable in response to differences in the pressures of the fluid admitted by the housing ports, the sensing diaphragm further having opposing surfaces along the active portion thereof and movable electrodes deposited on said surfaces, said fixed and movable electrodes defining a pair of variable capacitors whose capacitances depend on the amount of deflection of the active portion of the sensing diaphragm; and
means for making electrical connection to said fixed and movable electrodes.

14. A transducer assembly, as defined in claim 13, in which:
the concavities in the thin insulating layers have a contour matching the natural deflection curve of the active portion of the diaphragm.

15. A transducer assembly, as defined in either claim 13 or 14, in which:
the thin insulating layers have a dielectric constant substantially greater than unity whereby the capacitive gaps of the variable capacitors are defined substantially by the concavities in said layers.

16. A transducer assembly, as defined in any of the foregoing claims 13 or 14, in which:
the thin insulating layers include peripheral portions that define the spacing between the planar surfaces of the reference plates and the surfaces of the sensing diaphragm.

17. A transducer assembly, as defined in any of the foregoing claims 13 or 14, in which:
the transducer is retained within the housing under compressive preload.

18. A transducer assembly, as defined in claim 17, in which:
means for relieving thermal strain is interposed between the outer surface of at least one of the reference plates and an opposing surface in the housing, said strain relieving means having a thermal expansion/contraction characteristic that, in conjunction with the expansion/contraction characteristics of the housing and transducer, compensates for temperature variations to maintain said compressive preload at a substantially constant level.

19. A transducer assembly, as defined in any of the foregoing claims 13 or 14 in which:
an isolation diaphragm is disposed proximate the outer surface of each reference plate, said isolation diaphragm and said outer surface defining between them an outer chamber;
a passage connects the concavity in the insulating layer on each reference plate with said outer chamber; and
a liquid completely fills the concavities, outer chambers and the connecting passages.

20. A differential pressure capacitive transducer assembly comprising:
a generally cylindrical housing having a pair of openings for admitting the fluids whose differential pressure is to be measured, the housing comprising two coaxial sections, each section having an inwardly directed, annular flange defining one of the openings;
a thermal strain relief ring inside the housing supported by one of the flanges;
a generally cylindrical differential pressure transducer disposed within the housing and coaxially therewith, said transducer being positioned between the thermal strain relief ring and the other flange and including:
a pair of opposed, generally cylindrical plates of electrically insulative material, each plate including an outer surface,
an inner planar surface, a fixed electrode deposited on the planar surface and a thin glass layer covering the planar surface and the electrode thereon, the glass layer including a central portion having a concavity formed therein, the concavities in the glass layers on the two plates being in facing relationship;

a disk-shaped sensing diaphragm of electrically insulative material interposed between the glass layers, the sensing diaphragm having opposing surfaces, an annular peripheral portion fixed between the glass layers, and a central, active portion spanning the facing concavities, the active portion of the sensing diaphragm being deflectable in response to the difference between the applied fluid pressures and having a natural deflection curve, the opposing surfaces of the diaphragm along the active portion thereof having movable electrodes deposited thereon, the movable and fixed electrode defining a pair of variable capacitors whose capacitances depend on the amount of deflection of the active portion of the sensing diaphragm, the concavities in the glass layers having a contour that matches the natural deflection curve of the active portion of the diaphragm, the glass layers further including peripheral portions defining the spacing between the inner, planar surfaces of the reference plates and the surfaces of the sensing diaphragm, said layers having a dielectric constant substantially greater than unity whereby the capacitive gaps of the variable capacitors are defined substantially by the concavities in said layers;

an isolation diaphragm disposed proximate the outer surface of each reference plate, said isolation diaphragm and said outer surface defining between them an outer chamber;

a passage connecting the concavity in the glass layer on each reference plate with each said outer chamber; and a liquid completely filling the concavities, outer chambers and connecting passages whereby fluid pressures applied to the isolation diaphragms are transmitted to the sensing diaphragm;

electrical leads connected to said fixed and movable electrodes for coupling said electrodes to electrical circuitry; and said transducer being retained between said thermal strain relief ring and other flange under compressive preload.

21. A transducer assembly, as defined in claim 20, in which:

said thermal strain relief ring has a thermal expansion/contraction characteristic that, in conjunction with the expansion/contraction characteristic of the housing and transducer, compensates for temperature variations to maintain said compressive preload at a substantially constant level.

22. A differential pressure measuring system comprising:

a housing adapted to admit fluids whose differential pressure is to be measured;

a differential pressure capacitance transducer mounted within said housing, said transducer comprising:

a reference plate of electrically insulating material, the plate including a planar surface having a first electrode thereon and a thin layer of electrically insulating material covering the planar surface and the electrode thereon, the insulating layer including a concave portion and a spacer portion; and a sensing diaphragm having a fixed portion bonded to the spacer portion of the insulating layer and an active portion deflectable in response to applied fluid pressure, the active portion of the sensing diaphragm facing the concave portion of the insulating layer and carrying a second electrode, the first and second electrodes comprising the elements of a variable capacitor, the concave portion having a contour matching the natural deflection curve of the active portion of the diaphragm and said insulating layer having a dielectric constant substantially greater than unity whereby the capacitive gap between the first and second electrodes is determined substantially by the distance between the second electrode and the surface of the concave portion of the insulating layer;

means for making electrical connection to the first and second electrodes; and an electronic circuit coupled to the connection means and having a transfer function for providing a linear output signal.

23. A measuring system, as defined in claim 22, in which:

the natural deflection curve of the active portion of the diaphragm is generally of the form:

$$y/y_{max} = a(b^2 - r^2)^2$$

where

"r" is the radial distance from the central axis of the transducer to the point under consideration;

"y" is the deflection at the point under consideration;

"$y_{max}$" is the maximum deflection of the diaphragm at its center; and

"a" and "b" are constants.

24. A measuring system, as defined in claims 22 or 23, in which:

the transfer function of the electronic circuit is of the form:

$$V_o = V_s[1 - k(C_2/C_1)]$$

where

"$V_o$" is the output voltage of the circuit;

"$V_s$" is the circuit supply voltage;

"$C_1$" and "$C_2$" are the transducer capacitances; and

"k" is a constant that includes factors such as trim resistances.

25. A transducer assembly, as defined in claim 18, in which:

the thin insulating layers include peripheral portions that define the spacing between the planar surfaces of the reference plates and the surfaces of the sensing diaphragm.

26. A transducer assembly, as defined in claim 18, in which:

the transducer is retained within the housing under compressive preload.

27. A transducer assembly, as defined in claim 19, in which:

the transducer is retained within the housing under compressive preload.

28. A transducer assembly, as defined in claim 1, in which:

the transducer is retained within the housing under compressive preload.

29. A transducer assembly, as defined in claim 1, in which:
- means for relieving thermal strain is interposed between the outer surface of at least one of the reference plates and an opposing surface in the housing, said strain relieving means having a thermal expansion/contraction characteristic that, in conjunction with the expansion/contraction characteristics of the housing and transducer, compensates for temperature variations to maintain said compressive preload at a substantially constant level.

30. A transducer assembly, as defined in claim 1, in which:
- means for relieving thermal strain is interposed between the outer surface of at least one of the reference plates and an opposing surface in the housing, said strain relieving means having a thermal expansion/contraction characteristic that, in conjunction with the expansion/contraction characteristics of the housing and transducer, compensates for temperature variations to maintain said compressive preload at a substantially constant level.

31. A transducer assembly, as defined in claim 1, in which:
- means for relieving thermal strain is interposed between the outer surface of at least one of the reference plates and an opposing surface in the housing, said strain relieving means having a thermal expansion/contraction characteristic that, in conjunction with the expansion/contraction characteristics of the housing and transducer, compensates for temperature variations to maintain said compressive preload at a substantially constant level.

32. A transducer assembly, as defined in claim 18, in which:
- an isolation diaphragm is disposed approximate the outer surface of each reference plate, said isolation diaphragm and said outer surface defining between them an outer chamber;
- a passage connects the concavity in the insulating layer on each reference plate with said outer chamber; and
- a liquid completely fills the concavities, outer chambers and the connecting passages.

33. A transducer assembly, as defined in claim 19, in which:
- an isolation diaphragm is disposed approximate the outer surface of each reference plate, said isolation diaphragm and said outer surface defining between them an outer chamber;
- a passage connects the concavity in the insulating layer on each reference plate with said outer chamber; and
- a liquid completely fills the concavities, outer chambers and the connecting passages.

34. A transducer assembly, as defined in claim 28, in which:
- an isolation diaphragm is disposed approximate the outer surface of each reference plate, said isolation diaphragm and said outer surface defining between them an outer chamber;
- a passage connects the concavity in the insulating layer on each reference plate with said outer chamber; and
- a liquid completely fills the concavities, outer chambers and the connecting passages.

* * * * *